(12) United States Patent
Newell et al.

(10) Patent No.: US 6,916,441 B2
(45) Date of Patent: Jul. 12, 2005

(54) POST PROCESSING THREE-DIMENSIONAL OBJECTS FORMED BY SOLID FREEFORM FABRICATION

(75) Inventors: Kenneth J. Newell, Valencia, CA (US); Kris Alan Schmidt, Granada Hills, CA (US); Michael Thomas Sherwood, Agoura Hills, CA (US)

(73) Assignee: 3D Systems, Inc., Valencia, CA (US)

( * ) Notice: Subject to any disclaimer, the term of this patent is extended or adjusted under 35 U.S.C. 154(b) by 379 days.

(21) Appl. No.: 10/084,726

(22) Filed: Feb. 25, 2002

(65) Prior Publication Data

US 2003/0067098 A1 Apr. 10, 2003

Related U.S. Application Data

(63) Continuation-in-part of application No. 09/970,727, filed on Oct. 3, 2001.

(51) Int. Cl.[7] ............................ B06B 1/02; B29C 71/00; B29C 71/02
(52) U.S. Cl. ...................... 264/442; 264/340; 264/344; 264/345; 264/348
(58) Field of Search .......................... 264/69, 233, 234, 264/237, 340, 344, 345, 348, 442

(56) References Cited

U.S. PATENT DOCUMENTS

| | | |
|---|---|---|
| 5,136,515 A | 8/1992 | Helinski |
| 5,141,680 A | 8/1992 | Almquist et al. |
| 5,252,264 A | 10/1993 | Forderhase et al. |
| 5,503,785 A | 4/1996 | Crump et al. |
| 5,555,176 A | 9/1996 | Menhennett et al. |
| 5,617,911 A | 4/1997 | Sterett et al. |
| 5,866,058 A | 2/1999 | Batchelder et al. |
| 5,997,795 A | * 12/1999 | Danforth et al. ............ 264/401 |
| 6,132,665 A | 10/2000 | Bui et al. |
| 6,259,962 B1 | 7/2001 | Gothait |

FOREIGN PATENT DOCUMENTS

| | | |
|---|---|---|
| WO | 97/11837 A1 | 4/1997 |
| WO | 01/26023 A1 | 4/2001 |

OTHER PUBLICATIONS

U.S. Appl. No. 09/971,247, filed Oct. 3, 2001, by Schmidt et al.
U.S. Appl. No. 09/971,337, filed Oct. 3, 2001, by Schmidt.

* cited by examiner

Primary Examiner—Leo B. Tentoni
(74) Attorney, Agent, or Firm—James E. Curry; Ralph D'Alessandro

(57) ABSTRACT

A method for removing supports from a three-dimensional object formed by solid freeform fabrication. The three-dimensional object and support structure both contain a phase change component in order to achieve the desired phase change characteristics needed for dispensing the material. The method prevents the phase change material within the three-dimensional object from migrating within the object during post processing to remove the support structure.

28 Claims, 5 Drawing Sheets

POST PROCESSING THREE-DIMENSIONAL OBJECTS FORMED BY SOLID FREEFORM FABRICATION

This application is a continuation-in-part of U.S. patent application Ser. No. 09/970,727 filed Oct. 3, 2001.

BACKGROUND OF THE INVENTION

1. Field of the Invention

The invention relates in general to solid deposition modeling, and in particular to a post processing technique to remove support material from a three-dimensional object formed from a build material.

2. Description of the Prior Art

Recently, several new technologies have been developed for the rapid creation of models, prototypes, and parts for limited run manufacturing. These new technologies are generally called Solid Freeform Fabrication techniques, and are herein referred to as "SFF." Some SFF techniques include stereolithography, selective deposition modeling, laminated object manufacturing, selective phase area deposition, multi-phase jet solidification, ballistic particle manufacturing, fused deposition modeling, particle deposition, laser sintering, and the like. Generally in SFF techniques, complex parts are produced from a modeling material in an additive fashion as opposed to conventional fabrication techniques, which are generally subtractive in nature. For example, in most conventional fabrication techniques material is removed by machining operations or shaped in a die or mold to near net shape and then trimmed. In contrast, additive fabrication techniques incrementally add portions of a build material to targeted locations, layer by layer, in order to build a complex part. SFF technologies typically utilize a computer graphic representation of a part and a supply of a building material to fabricate the part in successive layers. SFF technologies have many advantages over conventional manufacturing methods. For instance, SFF technologies dramatically shorten the time to develop prototype parts and can produce limited numbers of parts in rapid manufacturing processes. They also eliminate the need for complex tooling and machining associated with conventional subtractive manufacturing methods, including the need to create molds for custom applications. In addition, customized objects can be directly produced from computer graphic data in SFF techniques.

Generally, in most SFF techniques, structures are formed in a layer by layer manner by solidifying or curing successive layers of a build material. For example, in stereolithography a tightly focused beam of energy, typically in the ultraviolet radiation band, is scanned across a layer of a liquid photopolymer resin to selectively cure the resin to form a structure. In Selective Deposition Modeling, herein referred to as "SDM," a phase change build material is jetted or dropped in discrete droplets, or extruded through a nozzle, to solidify on contact with a build platform or previous layer of solidified material in order to build up a three-dimensional object in a layerwise fashion. Other synonymous names for SDM used in this new industry are solid object imaging, solid object modeling, deposition modeling, multi-jet modeling, three-dimensional printing, thermal stereolithography, and the like. Often, a thermoplastic material having a low-melting point is used as the solid modeling material, which is delivered through a jetting system such as an extruder or print head. One type of SDM process which extrudes a thermoplastic material is described in, for example, U.S. Pat. No. 5,866,058 to Batchelder et al. One type of SDM process utilizing ink jet print heads is described in, for example, U.S. Pat. No. 5,555,176 to Menhennett et al. Some thermoplastic build materials used in SDM are available and sold under the names ThermoJet® 2000 and ThermoJet® 88 by 3D Systems, Inc. of Valencia, Calif. Also, some formulations for thermoplastic phase change build materials are disclosed in U.S. Pat. No. 6,132,665 to Bui et al.

Recently, there has developed an interest in utilizing curable phase change materials in SDM. One of the first suggestions of using a radiation curable build material in SDM is found in U.S. Pat. No. 5,136,515 to Helinski, wherein it is proposed to selectively dispense a UV curable build material in an SDM system. Some of the first UV curable material formulations proposed for use in SDM systems are found in Appendix A of International Patent Publication No. WO 97/11837, where three reactive material compositions are provided. More recent teachings of using curable materials in three-dimensional printing are provided in U.S. Pat. No. 6,259,962 to Gothait and in International Publication Number WO 01/26023.

However, one of the most fundamental problems associated with SDM processes is the adverse effects resulting from gravitational forces that undesirably act on a part during the build process. All SDM processes must deal with gravitational forces. For example, most downward facing surfaces built by SDM processes need special supports in order to stabilize the part during the build process.

One method of supporting the three-dimensional object to counter gravitational forces is to utilize dissimilar materials in the build process. For example, two different solidifying materials can be selectively deposited in a layer by layer process, one material for building the part, and the other material for building the support structure. There are generally four recognized methods for removing dissimilar support material for an SDM object. Three of the methods were initially proposed in U.S. Pat. No. 5,136,515 to Helinski. The first three methods are 1) removing the support material by physical force, 2) removing the support material by application of heat, and 3) removing the support material by chemical means. The fourth method, having little applicability to SDM techniques, involves utilizing a powder as a support material that does not adhere to the object.

In the first separation approach, the materials are carefully selected in order to establish a weak bond joint at their juncture such that the application of an applied force separates the support structure from the part along the joint. For example, this approach is described in U.S. Pat. No. 5,617,911 to Sterett et al. and in International Publication WO 01/26023 of Objet Geometries Ltd., in Rehovot, Israel. Undesirably, the application of applied force to crack or crumble away the support material from the object has limitations. For instance, it is difficult, and sometimes impossible, to remove the support material for certain geometric configurations, such as in deep cavities or pockets. Further, delicate features of the three-dimensional object can be broken or damaged during the removal process.

The second separation approach is to select a support material having a lower melting point than the material of the formed object. After forming the object and support structure, the temperature of the composite is raised in order to melt out the support structure. This type of approach is described in, for example, U.S. Pat. No. 5,141,680 to Almquist et al.

The third approach is to select a support material that is soluble in a solvent in which the build material is not. After forming the object and support structure, the two are submersed into the solvent in order to dissolve away the support. One problem with this approach is that the solvent starts to saturate with removed support material and then eventually new solvent is needed. The disposal of the used solvent can be problematic. In addition, evaporative issues can arise resulting in the production of odors, and the like, when working with solvents. Thus, implementing this approach may not be user friendly or cost effective.

In the fourth approach a removable support material is deposited in particulate form, such as a powder, that is energized so as to fuse to form the part, with the un-fused powder acting as the support structure. This type of approach is described in, for example, U.S. Pat. No. 5,252,264 to Forderhase et al. Undesirably, however, this approach is limited for use with sintered powder materials and is generally unsuitable in applications utilizing flowable solid modeling materials to build parts.

When dispensing a curable acrylate/wax based material to form an object and a non-curable support material in SDM, it was initially envisioned to remove the support material by application of heat to melt the support material away. However, initial post processing tests utilizing heat to remove the support material undesirably affected the three-dimensional object. The thermal processing apparently caused the otherwise transparent acrylate in the object to become clouded and opaque. Further, the discoloration was not uniform throughout the object.

Thus, there is a need to develop a method and apparatus capable of removing a phase change support material dispensed to support a three-dimensional object formed from a build material without undesirably affecting the three-dimensional object. These and other difficulties of the prior art have been overcome according to the present invention.

BRIEF SUMMARY OF THE INVENTION

The present invention provides its benefits across a broad spectrum. While the description which follows hereinafter is meant to be representative of a number of such applications, it is not exhaustive. As will be understood, the basic methods and apparatus taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to successfully remove supports formed from a phase change material from a three-dimensional object formed from a cured phase change material.

It is another aspect of the present invention to successfully separate supports from a three-dimensional object without undesirably effecting the underlying three-dimensional object.

It is a feature of the present invention that supports can be melted and removed from the three-dimensional object without discoloring the object.

It is an advantage of the present invention that the non-curable wax content in the build material is prevented from migrating within the matrix of build material of the three-dimensional object when post processing the object to remove the support material.

These and other aspects, features, and advantages are achieved/attained in the method of the present invention for post processing an article formed by SSF, the article comprising a three-dimensional object and a support structure, the three-dimensional object and the support structure comprising at least one phase change component. In one embodiment the post processing method comprises:

providing a temperature controllable environment for the article;

placing the article in the temperature controllable environment and raising the temperature of the article so that the support structure transitions to a flowable state;

removing substantially all of the support structure in the flowable state from the article;

changing the temperature of the controllable environment above the freezing point of the phase change component;

holding the temperature of the controllable environment just above the freezing point of the phase change component until the temperature of all the regions of the three-dimensional object substantially equalize; and lowering the temperature of the controllable environment below the freezing point of the phase change component.

In another embodiment the post processing method comprises:

providing a temperature controllable environment for the article;

placing the article in the temperature controllable environment at a temperature that causes the support structure to transition to a flowable state;

removing substantially all of the support structure in the flowable state from the article;

submersing the article in a fluid medium in the temperature controllable environment at a temperature above the melting point of the phase change component, the phase change component being at least partially soluble in the fluid medium; and lowering the temperature of the three-dimensional object in the fluid of fatty acid ester below the freezing point of the curable phase change composition.

BRIEF DESCRIPTION OF THE DRAWINGS

The aspects, features, and advantages of the present invention will become apparent upon consideration of the following detailed disclosure of the invention, especially when it is taken in conjunction with the accompanying drawings wherein.

To facilitate understanding, identical reference numerals have been used, where possible, to designate identical elements that are common in the figures.

DETAILED DESCRIPTION OF THE PREFERRED EMBODIMENTS

Figure 1:
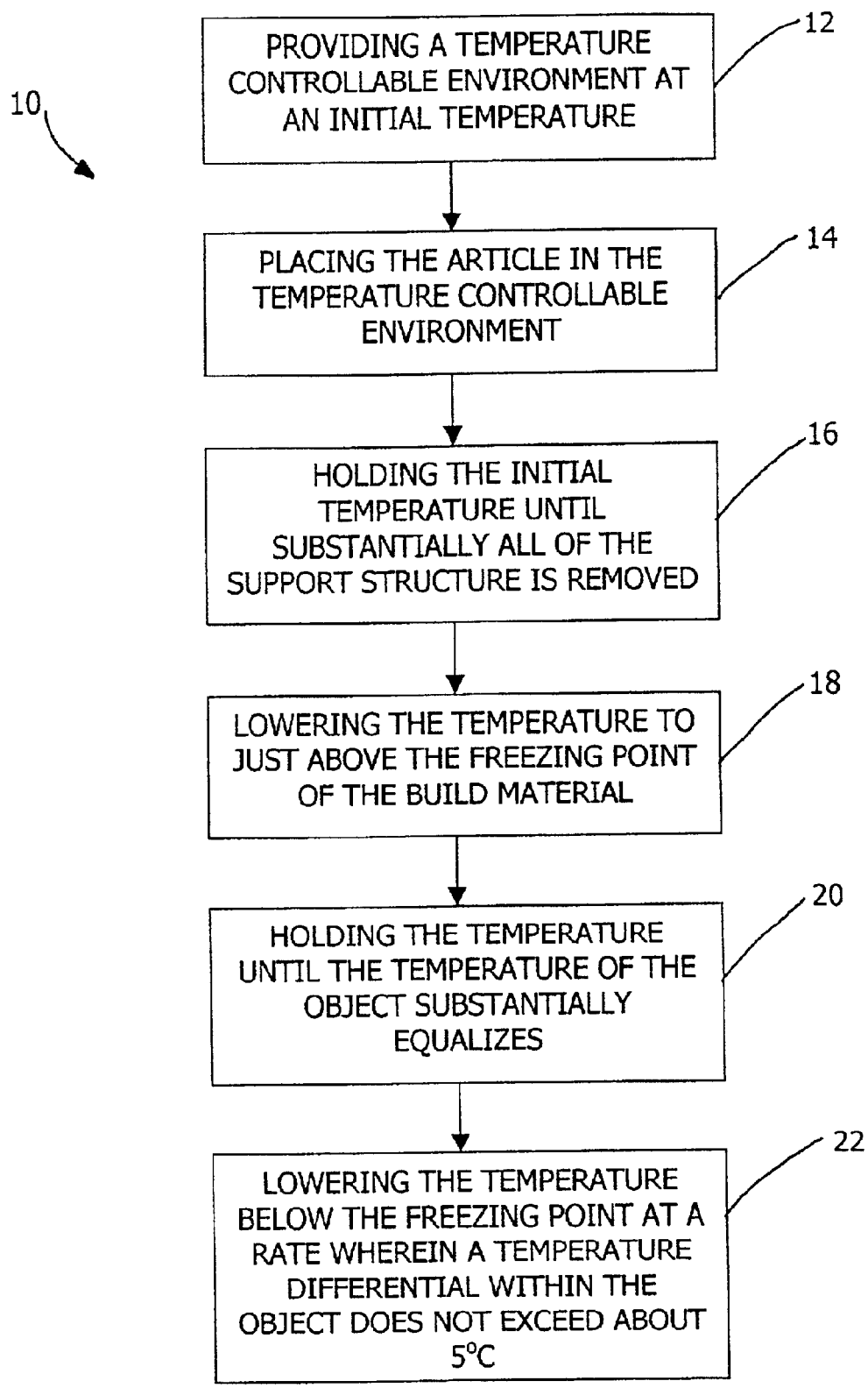
FIG. 1 is a flow chart of an embodiment of the post processing method of the present invention.

While the present invention is applicable to all SFF techniques and objects made therefrom, the invention will be described with respect to an article formed by an SDM technique utilizing an ink jet print head dispensing an ultraviolet radiation curable phase change material. However, it is to be appreciated that the present invention post processing technique can be implemented with any SDM technique utilizing a wide variety of materials. For example, a curable phase change material can be cured by exposure to actinic radiation having wavelengths other than in the ultraviolet band of the spectrum, by subjecting the material to thermal heat, or by chemical reaction.

As used herein, the term "a flowable state" of a build material is a state wherein the material is unable to resist shear stresses that are induced by a dispensing device, such as those induced by an ink jet print head when dispensing the material, causing the material to move or flow. Preferably the flowable state of the build material is a liquid state, however the flowable state of the build material may also exhibit thixotropic-like properties. A material is in a flowable state when the temperature of the material is above the material's melting point. The term "solidified" and "solidifiable" as used herein refer to the phase change characteristics of a material where the material transitions from the flowable state to a non-flowable state. A "non-flowable state" of a build material is a state wherein the material is sufficiently self-supportive under its own weight so as to hold its own shape. A build material existing in a solid state, a gel state, a paste state, or a thixotropic state, are examples of a non-flowable state of a build material is a state wherein the material is sufficiently self-supportive under its own weight so as to hold its own shape. A build material existing in a solid state, a gel state, a paste state, or a thixotropic state, are examples of a non-flowable state of a build material for the purposes herein. A material is in a non-flowable state when the temperature of the material is below the material's freezing point. In addition, the term "cured" or "curable" refers to any polymerization reaction. Preferably the polymerization reaction is triggered by exposure to actinic radiation or thermal heat. Most preferably the polymerization reaction involves the cross-linking of monomers and oligomers initiated by exposure to actinic radiation in the ultraviolet or infrared wavelength band. Further, the term "cured state" refers to a material, or portion of a material, in which the polymerization reaction has substantially completed. It is to be appreciated that as a general matter the material can easily transition between the flowable and non-flowable state prior to being cured. However, once cured, the material cannot transition back to a flowable state and be dispensed by the apparatus.

A preferred build material and support material is disclosed in U.S. patent application Ser. No. 09/971,247 filed Oct. 3, 2001, which is herein incorporated by reference as set forth in full. The materials preferably have a melting point from about 45° C. to about 65° C., a freezing point from about 33° C. to about 60° C., and a jetting viscosity of about 10 to about 16 centipoise at the dispensing temperature. A preferred method and apparatus for dispensing the preferred materials to form a three-dimensional object and underlying support structure is disclosed in U.S. patent application Ser. No. 09/971,337 filed on Oct. 3, 2001, which is herein incorporated by reference as set forth in full. The preferred dispensing temperature is about 80° C.

In general, both materials are dispensed in a layer wise manner during the SDM build process, and a planarizer is driven over each layer to normalize the layers during the build process. The build material is a photocurable acrylate/wax blend, and the support material is primarily a wax. After all the layers are formed, it was envisioned that the support material could be easily and effectively removed by heating the object and support structure above the melting point of the support material, causing the support material to melt away to reveal the three-dimensional object.

Four formulations of the build material are provided by weight percent in Table 1. The preferred build material is Example 4 in Table 1 because it was determined to be the most durable. The materials had the following physical properties as shown in Table 2.

TABLE 1

| Mfg. ID No. | General Component Name | Ex. 1 | Ex. 2 | Ex. 3 | Ex. 4 |
|---|---|---|---|---|---|
| CN980 | Urethane Acrylate | 7.2% | | | 6.5% |
| CN981 | Urethane Acrylate | | | 26% | |
| E3200 | Epoxy Acrylate | | | 14% | 6.0% |
| CN975 | Hexafunctional Urethane Acrylate | | 7.2% | | |
| CN2901 | Urethane Acrylate | 27.5% | 27% | | 18.7% |
| SR203 | Tetrahydrofurfuryl Methacrylate | | | | |
| SR205 | Triethylene glycol dimethacrylate | 33% | | 46.5% | 41.05% |
| SR340 | 2-phenoxyethyl methacrylate | | | | |
| SR313 | Lauryl methacrylate | | 18% | | |
| SR454 | Ethoxylated₃ Trimethylolpropane Triacrylate | | 4.5% | | |
| SR604 | polypropylene glycol monomethacrylate | | | | 12.0% |
| CD406 | Cyclohexane di-methanol diacrylate | | 30% | | |
| SR493D | Tridecyl Methacrylate | 19% | | | |
| ADS038 | Urethane wax | 7% | 5.3% | 10% | 10.0% |
| ADS043 | Urethane wax | 4.3% | 6% | 1.5% | 2.0% |
| I-184 | Photo-initiator | 2% | 2% | 2% | 3.75% |
| TOTAL | | 100% | 100% | 100% | 100.0% |

TABLE 2

| Property | Ex. 1 | Ex. 2 | Ex. 3 | Ex. 4 |
|---|---|---|---|---|
| Viscosity at 80° C. | 12.9 cps | 12.9 cps | 12.9 cps | 12.8 cps |
| Melting point ° C. | 52° C. | 55° C. | 57° C. | 56° C. |
| Freezing point ° C. | 46° C. | 47.5° C. | 50° C. | 49.5° C. |
| Elongation % E (after cure) | 9% | 4% | 5% | 11.3% |

The following components used in the four formulations listed in Table 1 are available from Sartomer Company, Inc. of Exton, Pa., under the following designations: CN 980, CN 981, CN 975, CN2901, SR 203, SR 205, SR 340, SR 313, SR 454, CD 406, SR604, and SR 493D. The components ADS 038 and ADS 043 are available from American Dye Source, Inc. of Quebec, Canada. The epoxy acrylate under the designation E 3200 is available from UCB Chemical, Inc. of Atlanta, Ga. The photoinitiator under the designation 1–184 listed is available from Ciba Specialty Chemicals, Inc. of New York, N.Y.

The formulations in Table 1 where made in accordance with the present invention by mixing the individual components in a kettle equipped with a mixing blade. A kettle was preheated to about 85° C. and the components placed into the kettle, the kettle closed and stirring was commenced. Stirring continued as the components eventually equalized to the temperature of the kettle. Stirring was then continued until a homogenized molten state was achieved. The viscosity was measured and adjusted as needed. It took approximately 2.5 hours to mix a 75-pound quantity of the formulations to a homogenized state. The build material formulations were then removed from the kettle and filtered through a 1-micron absolute filter while in the flowable state. The formulations were then cooled to ambient temperature at which they transitioned from the flowable to the non-flowable state.

It is to be appreciated that the curable phase change build material formulations contain between about 5% to about 25% by weight of a non-reactive wax. In the preferred embodiment, the non-reactive wax content is between about 10% to about 12% by weight, and is comprised of a urethane wax. However, other non-reactive waxes could be used such as carbon hydrogenated waxes, paraffin waxes, fatty ester waxes, and the like. The wax content is necessary in order to provide the appropriate phase change characteristics of the build material so that the material will solidify after being dispensed. This wax, which does not cure when exposed to actinic radiation, is trapped within the cured matrix of the polymerized reactive components of the build material formulation.

The preferred non-curable phase change support material comprises 70% by weight octadecanol available from Ruger Chemical Co., Inc., of Irvington, N.J., and 30% by weight of a tackifier sold under the designation of KE 100 available from Arakawa Chemical (USA) Inc., of Chicago, Ill. This support material formulation has a viscosity of about 11.0 centipoise at a temperature of about 80° C., and a melting point of about 58° C. and a freezing point of about 49.5° C. The formulation was mixed in a kettle equipped with a mixing blade. The kettle is preheated to about 85° C. and the octadecanol is placed into the kettle first, as it has the lower melting point. The kettle is closed and stirring commenced. Once the octadecanol has melted, the KE 100 is added to the mixture while stirring continues. The kettle is closed and stirring continues until a homogenized state of the mixture is achieved. The viscosity is measured and adjusted if needed. The formulation is then removed from the kettle and filtered through a 1-micron absolute filter while in the flowable state. The formulation is then cooled to ambient temperature wherein it transitions from the flowable to the non-flowable state.

Test specimens were formed by an SDM apparatus utilizing the piezoelectric Z850 print head used in the Phaser® 850 printer available from Xerox Corporation's Office Products Business Unit of Wilsonville, Oreg. The Z850 print head was configured to also dispense the non-curable phase change support material as well as the curable phase change build material. The Z850 print head was modified to dispense the materials at a temperature of about 80° C. Both materials solidified generally upon contact in the layer being formed during the build process, and after each layer was formed the layers were cured by exposure to actinic radiation. Only the reactive polymers in the dispensed build material were cured by the exposure to actinic radiation which initiated the polymerization reaction. Hence, the test specimens comprised a matrix of cured build material dispersed with between about 5% to about 25% by weight of a non-reactive wax, and the matrix being partially surrounded by solidified support material.

A variety of test specimens having different geometric shapes were made. The test specimens needed to be generally representative of the variety of geometric shapes that can be made by SDM. Thin disks were made that were about ⅛ inch thick having a diameter of about 2 inches. Thick disks were made that were between about 1 and 2 inches thick having a diameter of about 2 inches. A thin-walled 90-degree tubular elbow was also made for testing, as was a thin walled cell phone shell structure.

The test specimens were used in order to develop an appropriate method for removing the support material. Generally it was preferred to develop a method relying on the application of thermal heat from an appropriate fluid medium to bring the support material back to a flowable state to melt the support material away and reveal the three-dimensional object. A number of methods were tried to provide thermal heat via a fluid medium to melt away the support material. Some of the first tests involved placing the test parts in a vat of organic oil at a temperature of about 90° C. and allowing the support material to melt and settle to the bottom of the vat. Peanut oil was used. The liquid vat was also physically agitated so as to assist in drawing the melted support material away from the three-dimensional object. In other tests mineral oil was also used as the heat transferring medium in the vat. In other tests the specimens were placed in an oven at a temperature of about 90° C. and the support material allowed to melt and run off the underlying objects and into the container. Thus, organic oil, mineral oil, and air were used as the heat transferring fluid medium in many of the tests; however, aqueous solutions, oil-based solutions, and oil-based fluids where also utilized as the heat transferring fluid medium.

The initial post processing tests utilizing heat to remove the support material undesirably affected the three-dimensional object. The test specimens were initially placed in a temperature controlled environment between about 90° C. to about 200° C. to melt away the support material, and were then brought to room temperature within 5 to 20 minutes. The thermal processing apparently caused the otherwise transparent acrylate in the object to become clouded and opaque. Further, the discoloration was not uniform throughout the object. Thin features appeared transparent and thick features appeared opaque. A variety of different thermal processing steps were attempted to remove the supports, however, internal discoloring of the three-dimensional object still occurred. It was not readily apparent what was causing the undesirable discoloration effect during post processing.

It was theorized that the discoloration occurs due to thermal stresses resulting during part cooling causing the wax content that permeates the matrix of cured build material to migrate to regions of lower compressive stresses during post processing. The liquid wax is believed to move in capillary like fashion towards regions of the part which remain above the freezing point of the build material composition. As the part cools rapidly below the freezing point, generally below about 70° C., the external regions cool before the internal regions of the part. As the outer regions cool and contract faster than the inner regions, the wax component in the build material is believed to migrate towards the inner regions of the three-dimensional object, and the inner portions then solidify with a substantially higher volume percentage of the wax component. It is believed that this produces objects undesirably having transparent edges and opaque centers. It is believed the transparent edges of the objects are from where the wax content had migrated, and the opaque centers of the objects are to where the wax content had migrated.

It was then proposed that by cooling the part slowly and evenly after the support material has been substantially melted and removed, the wax component in the build material would be prevented from becoming transient. It was believed this would eliminate the undesirable discoloration effects. Test specimens were placed in a temperature controlled vat of oil. The temperature of the vat was initially raised to between about 90° C. and about 150° C. prior to placing the specimens in the vat. The support material melted and settled to the bottom of the vat. The temperature in the vat was then controllably lowered to room temperature very slowly so that the temperature of the regions of the specimens would remain substantially equal and not vary by more than 5° C. at any point in time. The specimens processed in this manner did not exhibit any of the undesirable discoloring effects previously shown. Thus, it was initially determined that by keeping the temperature differential of the regions within the three-dimensional object between less than about 50° C. at any point in time during the cooling process, the undesirable discoloring effects are eliminated. Alternatively stated, if the temperature of the regions of the three-dimensional object remain substantially equal during the cooling process, the undesirable discoloring effects are eliminated. However, it is undesirable to maintain this temperature differential during the entire cooling process as the process would take too long, particularly for large three-dimensional objects.

It was then proposed that the 5° C. temperature differential need only be maintained when cooling the specimens past the freezing point of the wax component of the build material. This was investigated by placing specimens in a temperature controlled environment comprising a heated vat of oil. The temperature of the vat was initially raised to between about 90° C. and about 150° C. prior to placing the specimens in the vat. After the specimens were placed in the vat the support material melted and settled to the bottom. The temperature of the vat was then lowered to about 75° C. The temperature in the vat was then controllably lowered between about 75° C. to about 40° C. so that the temperature of the regions of the specimens would remain substantially equal as the freezing point of the build material composition was crossed. After the freezing point was crossed, most of the specimens were removed from the vat and allowed to return to ambient temperature. It was determined from further testing that cooling the specimens from between about 65° C. to about 45° C. over a period of between about 5 to about 10 minutes eliminated the discoloration effects discussed previously, in which the freezing point of the build material composition was within this temperature range, such as the preferred build material in example 4 of Table 1 which has a freezing point of about 49.5° C. Thus, it was discovered that lowering the temperature between about 65° C. to about 45° C. over a period of between about 5 to about 10 minutes allows the temperature of the regions of the specimens to remains substantially equal as the freezing point is crossed during the cooling.

It was also found that initial melting temperatures generally above about 150° C. caused the cured components in the objects to crack and/or delaminate. Some specimens heated above about 150° C. give the appearance of having trapped bubbles, and some turned yellow. Thus, it was determined the initial temperature for removing the support material should not be raised above about 150° C. It was further found that the support material could be effectively removed from the three-dimensional objects at temperatures between about 90° C. and about 150° C., and preferably between about 120° C. and about 125° C.

Further experimentation was conducted with mineral oil in the vat instead of organic oil. Mineral oil as the heat transferring medium also provided successful results. When using organic oils such as peanut oil, slight yellowing was detected on the resultant objects, however, no yellowing was present when using mineral oil. If desired, other liquid mediums could be used as well, such as water. If water is used, the support material can easily be removed from the water, as it will float on the top surface of the water. When using water, the initial temperature should generally not exceed about 100° C.; however, coolant additives such as ethylene glycol can be included to prevent boiling at higher temperatures. Petroleum distillate oil-based solutions were also tried as a means for removing the support material with the hopes that the oil would help dissolve the wax material in the support material. The petroleum distillate lubricant sold under the name WD-40® by the WD-40 Company of San Diego, Calif. was used in tests to remove the support material. The support material did melt; however, the distillate penetrated the build material and appeared to dissolve and remove the constituent wax component of the build material. This left a bright white part without any transparency. Hence, petroleum distillates are believed to be too soluble with the wax component in the build material, which undesirably removes the wax component from the objects.

It is to be appreciated that there are a variety of ways to provide a temperature controllable environment for the post processing steps of the present invention. Instead of providing a liquid heat transferring medium in a vat, an oven operated in air can be used. Further, some of the steps can be executed with one temperature controllable device utilizing one heat transferring medium and other steps executed by a different temperature controllable device utilizing a different heat transferring medium. For instance, an oven can be used to initially remove a substantial amount of the support material, and the object can then be placed in a liquid vat for removing any residual support material. In this case a catch tank can acquire the substantial amount of support material removed by the oven, thereby reducing the quantity residing in the liquid vat. Because the support material in the liquid vat at some point must be removed, it is desirable to minimize the quantity of support material in the vat of liquid as much as possible. Alternatively, a vat of liquid support material can be provided for initially removing the support material instead of an oven. This would be advantageous as the non-curable phase change support material composition can be recycled without the need to separate the material from some dissimilar liquid heat transferring medium such as water or oil.

It was generally determined that some form of agitation during the post processing is necessary to assist in the removal of the residual support material. Some forms of agitation, such as ultrasonic stimulation, jet spray in air and/or fluid, stirring, and tumbling produced satisfactory results in assisting with the removal of residual support material, particularly in difficult to reach areas such as cavities and blind holes. However, the amount of agitation may vary depending on the specific geometric shape of the object being processed.

Referring to FIG. 1, a first embodiment of the post processing procedure of the present invention is generally identified by numeral 10. The post processing procedure involves providing a temperature controllable environment for the article at an initial temperature 12, followed by placing the article in the temperature controllable environment 14. The initial temperature is above the melting temperature of the support material so as to cause it to transition to a flowable state. The next step identified by numeral 16 involves holding the temperature of the controllable environment above the melting point of the phase change support structure until substantially all of the support material of the article is removed from the three-dimensional object. The next step identified by numeral 18 involves lowering the temperature of the three-dimensional object to a temperature just above the freezing point of the build material composition. The temperature just above the freezing point should be no more than about 15° C. above the freezing point so that the post processing will not take too long. The next step identified by numeral 20 involves holding this temperature until the temperature of all the regions of the three-dimensional object substantially equalize. Generally about 20 minutes is needed for the temperature of the three-dimensional object to equalize throughout all regions of the object. Shorter time periods are also possible, particularly for small objects or thin walled objects. The final step identified by numeral 22 involves slowly lowering the temperature of the three-dimensional object below the freezing point of the build material composition while keeping the temperature of the regions of the three-dimensional object substantially equal as the freezing point is crossed during the cooling step. Preferably the rate at which the temperature is lowered is sufficiently gradual such that a temperature differential within the three-dimensional object does not exceed about 5° C. at any time during cooling, and particularly when crossing the freezing point of the build material. The freezing point is crossed by about 5° C. below the freezing point, at which the three-dimensional object can be returned to ambient conditions at about any desired rate.

Initially the use of hot organic based oils was believed to provide several advantages over other heating transferring mediums. For example, the peanut oil that was used had a slightly lower density than cured material forming the specimens. This small density difference allows the part to remain submerged and nearly weightless during heating while also providing a means for transporting the melted material away from the part, as it will sink to the bottom of the vat. At about 120° C. the hot oil is reasonably safe to touch, and the entire post processing steps to remove the support material can be completed in under an hour. In addition, these organic oils, such as vegetable oil, peanut oil, sunflower oil, and the like, are non-toxic. However other heat transfer mediums were found to provide these advantages as well.

A method of post processing an article formed by SDM according to the first embodiment initially comprises providing a temperature controllable environment comprising an oven with the heat transferring medium being air. The temperature of the oven is initially raised above the melting point of the phase change support structure, and the article is then placed in the oven. Preferably the temperature is between about 80° C. and about 150° C., and more preferably to between about 120° C. to about 125° C. At this temperature the phase change support structure melts. The temperature is maintained for about 20 minutes so that substantially all of the support material is removed from the underlying three-dimensional object. The support material is drained into a container for disposal or recycling. This is done to remove a substantial amount of the support material prior to placing the three-dimensional object in a liquid heat transferring medium to remove the residual support material. This substantially reduces the quantity of support material that must later be removed from the liquid. However, any liquid may be used as the heat transferring medium to remove the substantial amount of support material instead of air, particularly since liquids are better thermal conductors and require less energy to maintain at elevated temperatures. Thus, post processing in a liquid medium such as an aqueous solution, oil-based solution, or oil-based fluid can desirably reduce energy consumption compared to a gas medium such as air.

The three-dimensional object is then submersed in a vat of liquid at a temperature of between about 80° C. and about 150° C. A number of different liquids can be used, such as mineral oil, organic oil, or water. The vat is held at this temperature for about 20 minutes in the liquid, such as the mineral oil, and is continuously stirred so as to remove the residual support material from the object. Preferably the temperature of the mineral oil is near the temperature at which the bulk of support material was removed in the oven. Stirring is accomplished with a paddle wheel provided within the container of mineral oil that is rotably driven at a constant angular velocity. While the mineral oil is continuously stirred, the residual support material settles to the bottom of the vat.

Next the temperature of the three-dimensional object is lowered to a temperature just above the freezing point of the build material composition, such as about 75° C., and held there for about 20 minutes. For the preferred build material, the temperature is lowered to above about 62° C., and is held there for about 20 minutes. Holding the temperature for about 20 minutes allows all the temperature of all the regions of the three-dimensional object to substantially equalize. The temperature is then slowly lowered below the freezing point temperature of the build material composition, such as to about 40° C. Lowering the temperature between about 75° C. to about 40° C. over a period of between about 15 minutes allows the temperature of the regions of the three-dimensional object to remain substantially equal as the freezing point is crossed during the cooling process. For the preferred build material, the temperature is lowered between about 62° C. to about 52° C. over a period of between about 10 minutes. Afterwards, the temperature of the three-dimensional object is returned to room temperature. The object can then be removed from the mineral oil and allowed to air dry, if desired.

The final step is a soapy water rinse with a liquid detergent at a temperature between 20° C. to about 55° C. This allows for the removal of any residual mineral oil and particles of support material from the surface of the object. A preferred liquid dishwashing detergent used is Ultra Dawn® liquid dish detergent available from The Procter & Gamble Company of Cincinnati, Ohio. Preferably, the steps are automated and performed by a single post processing apparatus. After the soapy water rinse the three-dimensional object is then air dried and cooled to atmospheric conditions.

Figure 2:
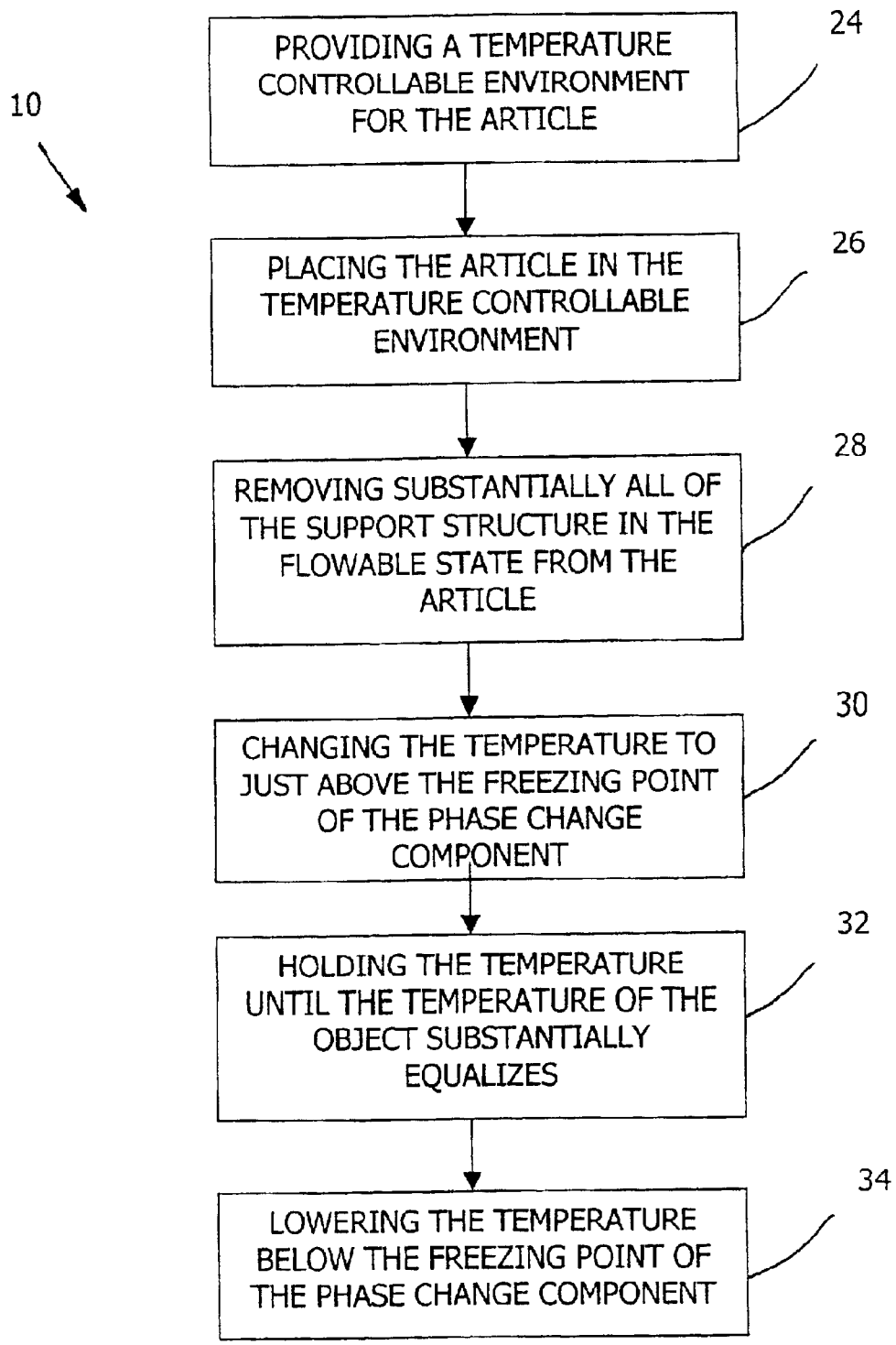
FIG. 2 is a flow chart of another embodiment of the post processing method of the present invention.

Referring to FIG. 2, a second embodiment of the post processing procedure of the present invention is generally identified by numeral 10. The post processing procedure 10 involves providing a temperature controllable environment for the article as identified by numeral 24. In this step the temperature controllable environment may be an oven operated under atmospheric conditions and may be preheated prior to placing the article in the temperature controllable environment, as identified by numeral 26. The article then remains in the temperature controllable environment for a sufficient time so that substantially all of the support structure transitions to a flowable state and is removed from the article, as identified by numeral 28. As discussed previously, there are numerous alternatives to removing substantially all of the support material, such as by placing the article in a liquid heat transferring medium at an elevated temperature.

Once substantially all of the support material has been removed, the article is ready to be brought back to ambient temperatures according to the present invention without adversely affecting the three-dimensional object. Referring back to FIG. 2, the next step involves changing the temperature of the article to just above the freezing point of the phase change component in the build material, as identified by numeral 30. Alternatively, it may not be necessary to change the temperature of the temperature controllable environment as identified by step 30, since the removal of the support material in step 28 can be achieved at a temperature just above the freezing point of the phase change component in the build material, if desired. However, it is desirable to hold the temperature just above the freezing point of the phase change component until the temperature of the regions of the three-dimensional object substantially equalizes throughout, as identified by numeral 32, prior to lowering the temperature below the freezing point, as identified by numeral 34. In this embodiment, the temperature of the article can be rapidly lowered below the freezing point without the need to reduce the temperature slowly past the freezing point, as discussed in the embodiment shown in FIG. 1. This is because the temperature differential throughout the regions of the three-dimensional object as it crosses the freezing point of the phase change component is substantially negligible, since the temperature of the object has already been equalized to a temperature near the freezing point in step 32. Once the freezing point has been crossed, the three-dimensional object can then be brought to room temperature, and/or followed up with a soapy water rinse and drying step as discussed previously, if desired.

Figure 3:
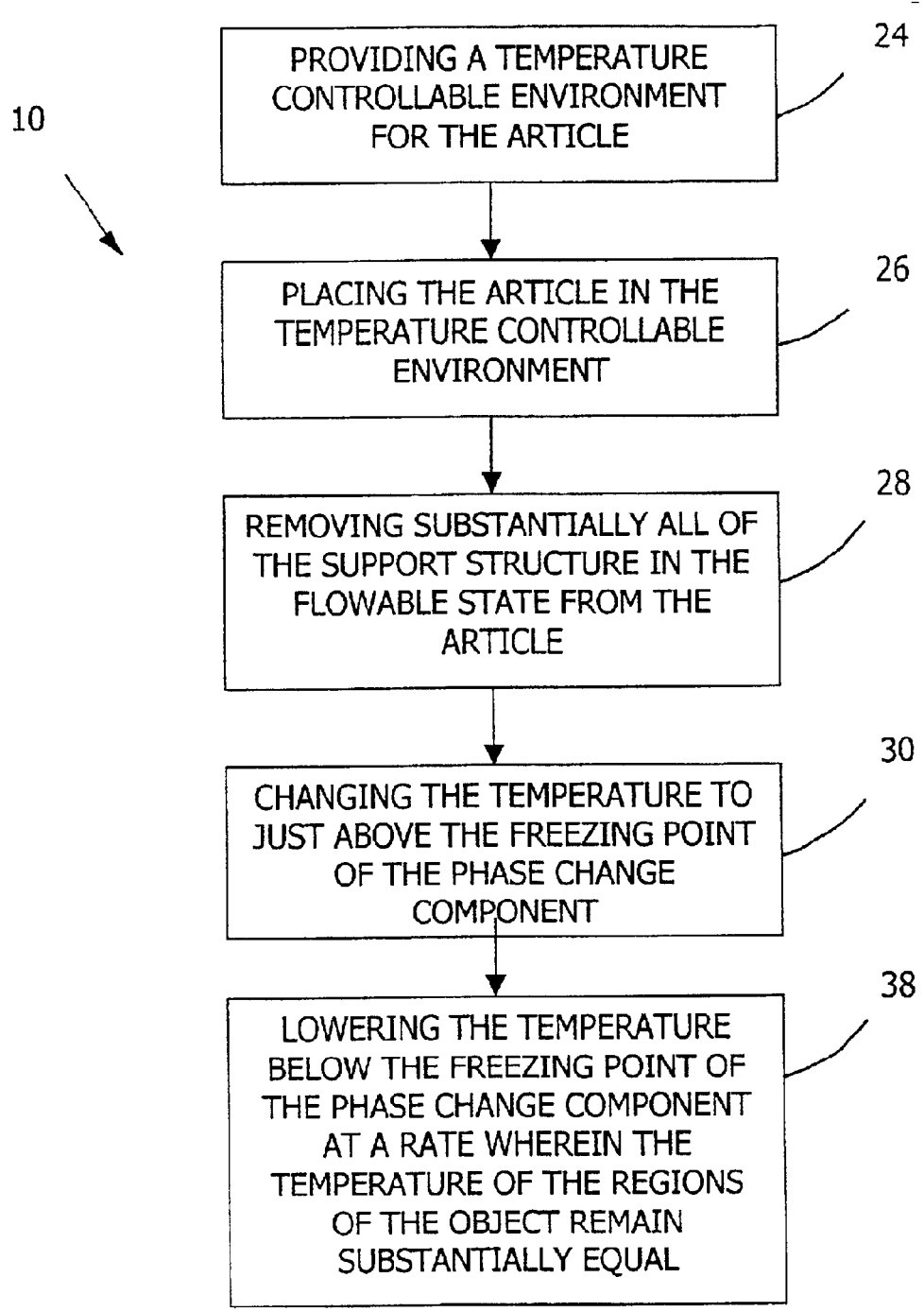
FIG. 3 is a flow chart of yet another embodiment of the post processing method of the present invention.

Referring to FIG. 3, a third embodiment of the post processing procedure is shown by numeral 10 which is nearly identical to the embodiment shown in FIG. 2. However, in the third embodiment the step of crossing the freezing point, as identified by numeral 38, is accomplished by lowering the temperature of the object below the freezing point at a rate wherein the temperature of the regions of the object remain substantially equal. Hence, in this embodiment the crossing of the freezing point is accomplished in a gradual manner, and not rapidly as in the embodiment in FIG. 2.

In all three embodiments, at least one temperature controllable environment is needed to control the execution of the process to remove the support material from the underlying three-dimensional objects. More than one temperature controllable environment may be used, such as an oven operated in air for the initial bulk removal of support material, and a heated vat of a fluid heat transferring medium for removing residual support material. In addition, a single temperature controllable environment may utilize one or more heat transferring mediums, such as air for the initial bulk melt and then a fluid for removing the residual support material, if desired. Further, post processing can be done exclusively in one or more fluid heat transferring mediums, if desired. Since the phase change component of the preferred support material is a wax material, a number of different fluid mediums can be used. The fluid medium may be an aqueous solution that contains a surfactant so as to form an emulsion with the wax material. For example, a detergent agent may serve as the surfactant in a water-wax emulsion. Alternatively, the fluid medium may be an oil-based solution or fluid such as an organic oil or an mineral oil, if desired. Still further, the fluid medium may be an immiscible fluid, such as water, or may be any combination thereof. The advantage of using an emulsion with a surfactant is that the surfactant stabilizes the wax content in the emulsion so that it can be separated from the fluid. Thus, once the temperature of the emulsion is lowered to allow the wax to return to a flowable (solid) state it may readily be removed. On the other hand, solvents such as mineral oils and organic oils are generally more effective in removing the residual wax material from the objects; however, solvents eventually become saturated with the wax material and loose their ability to further absorb the wax material. Thus, when utilizing solvents, a mixture is created wherein the wax material cannot be easily separated from the solvent. Thus, utilizing solvents generally produces waste material. Alternatively, when using an immiscible fluid the wax material can easily be separated from the fluid, however, they are not as effective in removing residual wax. Thus, a fluid medium comprising a combination of an emulsion with a surfactant, solvent, and/or immiscible fluid can be used to achieve an optimum balance between material removal and the production of waste.

It has been discovered that for three-dimensional objects of certain geometric shapes, a residual amount of support structure still undesirably remains on the object after the step of removing substantially all of the support structure from the article has been completed. Typically these objects have small cavities or blind holes in difficult to reach areas. Hence, after the bulk removal of support material, an additional procedure may be needed to remove residual support material. The residual support material, often residing in difficult to reach areas such as small cavities and passages, typically exhibits sufficient surface tension forces to adhere to the object even though the material is in a flowable state. Thus, providing some form of agitation to the object to dislodge the residual support during the removal process is desirable.

It has been found that by providing ultrasonic stimulation in an appropriate fluid medium produces excellent results in removing the residual support material from the article prior to reducing the temperature of the article below the freezing point of the phase change component in the build material. With reference to the embodiments shown in FIGS. 2 and 3, ultrasonic stimulation can be utilized after removing substantially all of the support structure as identified by numeral 28. Alternatively, the bulk removal step 28 may be executed in parallel to subjecting the article to ultrasonic stimulation, if desired; however, a significant amount of support material will accumulate in the ultrasonic fluid medium. Thus, an ultrasonic stimulator and fluid can be used as the temperature controllable environment for nearly any step in the post processing methods shown in FIGS. 2 and 3. When using an ultrasonic stimulator and fluid, it is desirable to maintain the temperature of the fluid above the freezing point of the phase change component in the build material so that the support material is removed while in a flowable state.

Three fluid mediums used in conjunction with ultrasonic agitation have provided excellent results in removing residual support material from the three-dimensional objects. Two fluid mediums, sold under the name Bioact® 280 and Bioact® 280e are precision cleaners available from Petroferm, Inc. of Fernandina Beach, Fla. These fluids have surfactants that establish an emulsion with the support wax material, with or without agitation, in which the support wax material can be easily removed so that the fluid can be re-used. The third fluid medium, sold under the name Formula 815GD by the Brulin Corporation of Indianapolis, Ind., is a surfactant which also forms an emulsion with the wax material when mixed with about ten parts water to one part formula. Another surfactant that could be used with water is sodium dodecyl sulfate, if desired.

When utilizing ultrasonic stimulation to remove residual support material, it has been found to be beneficial to lower the temperature of the article after bulk removal of support material so that the residual support material transitions back to a non-flowable state prior to placing the article into the ultrasonic fluid medium. Because the residual support material shrinks as it solidifies, it is believed that interstitial separation occurs between the outer surface of the three-dimensional object and the residual support material in contact with the outer surface. When using an emulsifier or solvent as the ultrasonic fluid medium, these interstitial cracks or separations are readily penetrated by the fluid when the article is placed in the ultrasonic vat which is believed to assist in overcoming the surface tension forces of the residual support material clinging to the three-dimensional object.

Other fluid mediums derived from an oil-based solutions or oil-based fluids can be used. Such fluids, typically containing fatty acid esters, are environmentally friendly and non-toxic and can be derived from organic oils such as linseed oil, soybean oil, castor oil, sunflower seed oil, tall oil, tung oil, and the like. A soybean-based fatty acid ester was initially selected since soy-based oils and their solvents are readily available and are relatively inexpensive. Experiments were conducted with soybean-based fatty acid esters comprising methyl esters. One water-rinsable, industrial soybean solvent sold under the name Soygold®2000 by A.G. Environmental Products LLC of Lenexa, Kans., produced excellent results in removing the support material. Further the solvent did not discolor or otherwise adversely affect the underlying three-dimensional object when removing the support material. Unexpectedly, it was discovered that, when using Soygold® 2000 as the heat transferring fluid medium, it was not necessary to cross the freezing point of the wax component of the build material in a slow and even manner to prevent wax migration. Instead, the temperature could be rapidly reduced past the freezing point of the wax component with no effect on the appearance of the part. It is believed that this beneficial phenomenon occurs because the soy solvent penetrates the object and plasticizes the wax component in the object, which prevents the wax from migrating during uneven cooling. Hence, the phase change component in the build material is partially soluble in the soy solvent. Although the soy solvent penetrates the object, it is not so soluble with the wax component of the build material so as to drive out the wax component as discovered when using petroleum distillates discussed previously. Thus, fatty acid esters that penetrate and plasticize the wax component of the build material eliminate the need to slowly lower the temperature of the fluid medium when crossing the freezing point of the wax component of the build material. Another soybean solvent sold under the name Soyclear®1500 by A.G. Environmental Products LLC of Lenexa, Kans., also produced excellent results in removing the support material. When using Soyclear it was found that the addition of a surfactant of between about 1.0% to about 4.0% by weight, such as a dishwashing detergent containing anionic and nonionic surfactants, substantially enhances the ability of the fluid medium to remove the residual support material. One dishwashing detergent sold under the name of fast acting Ultra Dawn® available from The Proctor & Gamble Company of Cincinnati, Ohio, whose active ingredient is triclosan, greatly improved the ability of the fluid medium in removing the residual support material.

Figure 4:
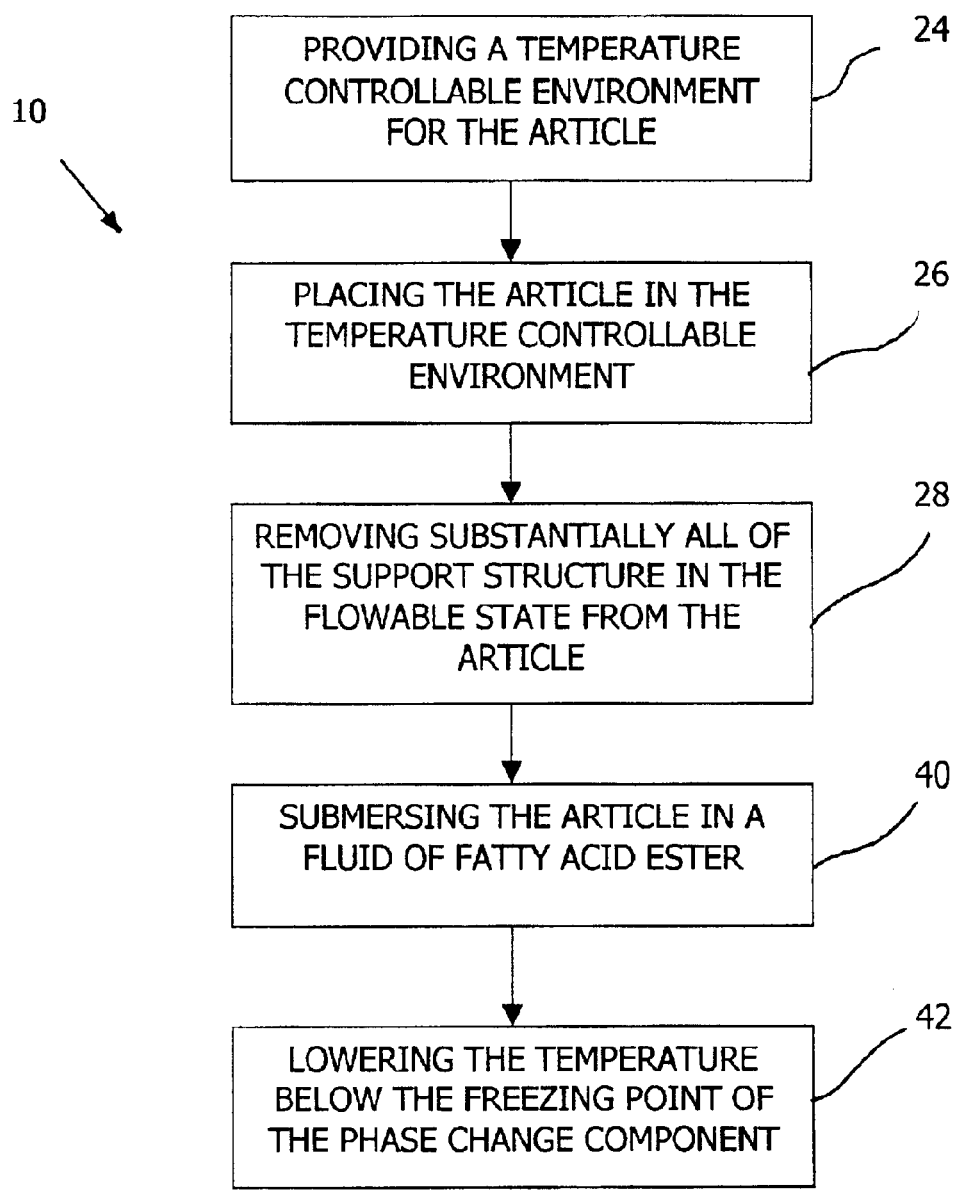
FIG. 4 is a flow chart of yet another embodiment of the post processing method of the present invention.

Referring to FIG. 4, a fourth embodiment of the post processing procedure is shown by numeral 10 which utilizes a fatty acid ester fluid medium for removing the residual support material. As with the other embodiments, the post processing procedure 10 initially involves providing a temperature controllable environment for the article, as identified by numeral 24. Initially, the temperature controllable environment is an oven that is pre-heated to a temperature above the melting point of the support material. As identified by numeral 26, the object and its support are placed in the temperature controllable environment to provide an initial bulk melt of the support material. Once substantially all of the support structure is removed by the initial bulk melt as identified by numeral 28, the article is then submersed in a fluid of fatty acid ester as identified by numeral 40. The fluid of fatty acid ester may be a soy-based product such as the Soygold® or Soyclear® products as discussed above, or may be based on other organic oils such as linseed oil, soybean oil, castor oil, sunflower seed oil, tall oil, tung oil, and the like. The temperature of the fluid of fatty acid ester is maintained above the melting point of the phase change support material to remove the support material. At this temperature the fatty acid ester penetrates and plasticizes the wax component in the build material, which also occurs at lower temperatures. It may be desirable to allow the article to return to room temperature after the initial bulk melt, or at least below the freezing point of the wax support material, in order to establish the interstitial separation between the residual support material and the object, as discussed previously. While submersed in the fluid of fatty acid ester, physical agitation may also be applied to the fluid medium to assist in removal of the residual support material. Generally, the article should remain in the fluid of fatty acid ester at a temperature above the melting point of the wax support material for approximately about 20 minutes to allow for complete removal of the wax support material. Then, as identified by numeral 42, the temperature of the article can be reduced below the freezing point of the phase change component in the build material at any desired rate. This is preferably done while the article remains in the fluid of fatty acid ester. Finally, the article can be rinsed with a soapy water rinse, as discussed previously, to remove any residual fatty acid ester fluid from the article and then dried.

Figure 5:
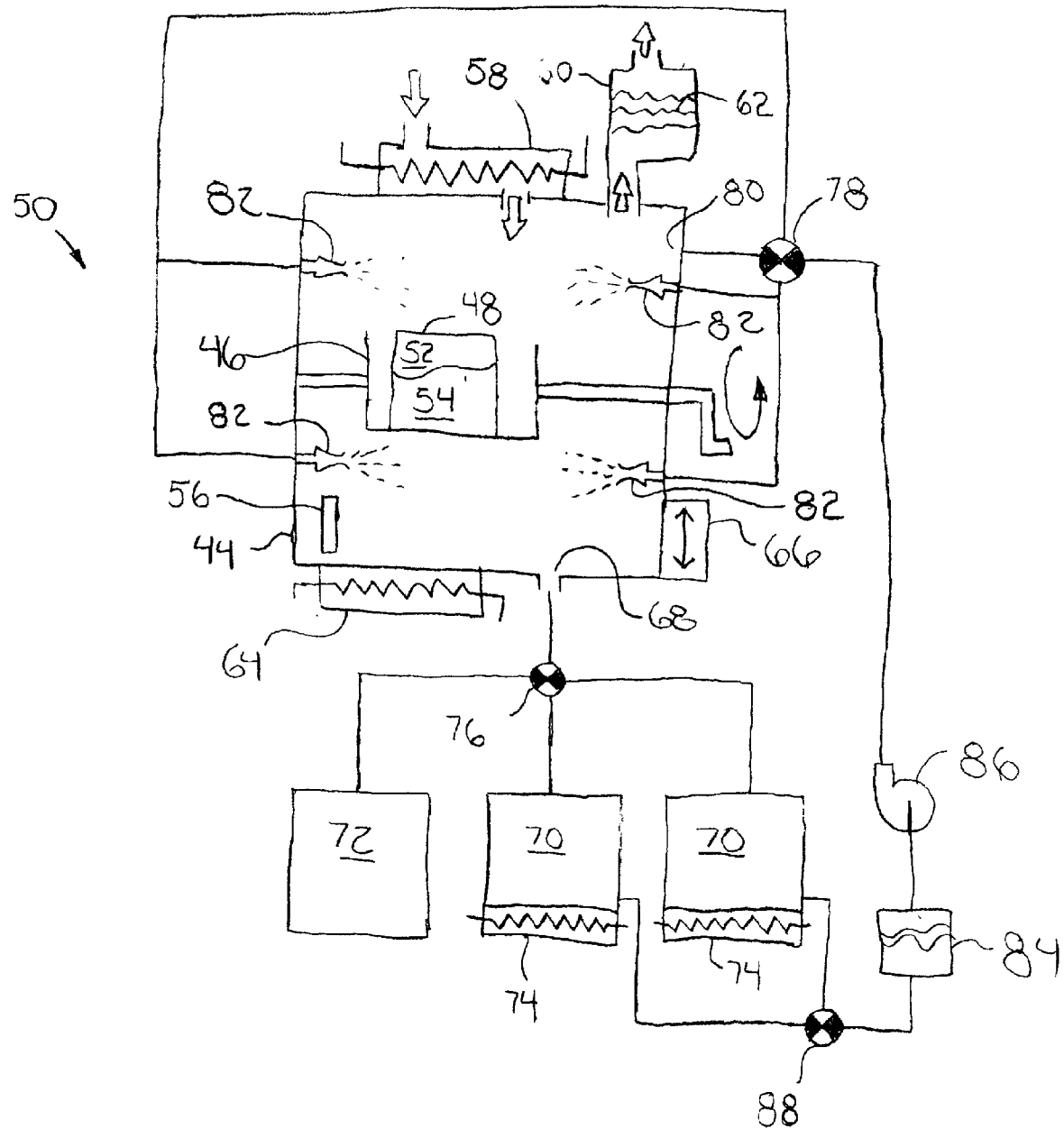
FIG. 5 is a schematic side view of an apparatus for practicing the post processing method.

Referring to FIG. 5, a schematic of an apparatus for practicing the present invention is generally shown by numeral 50. The apparatus 50 comprises a post processing chamber 44 which holds a basket 46 that is rotatable within the chamber. An article 48 comprising a three-dimensional object 52 and support structure 54 formed on a platform 56 is first separated from the platform. This is accomplished by cooling the platform 56, which is made of aluminum, to between about 0–5° C. Due to the differences of thermal expansion, the article 52 separates from the platform 56. The operator then mounts the article in the basket 46 for post processing. The platform may also be placed separately in the chamber 44, as shown, so residual support material can be removed. An air heater 58 is provided on the chamber 44 for delivering heated air to the chamber, and a vent 60 is also provided for allowing air to move in and out of the chamber, as needed. A filter 62 may also be provided in the vent to trap any odors that may be released during post processing. A chamber heater 64 is also provided on the chamber to maintain the temperature of the fluid mediums that are used during post processing. An agitation device 66 is also provided on the chamber 44 to assist in removing the support material during processing. The agitation device 66 may be a vibrator, a paddle wheel, or an ultrasonic stimulator. Agitation is also assisted as the basket is desirably rotated during processing. At the bottom of the chamber 64 is a drain opening 68 for allowing the support material and fluids to be removed from the chamber during processing. The fluid mediums used for post processing are held in separate storage containers 70, one container holding the fluid medium for removing the support material and the other for holding the final rinsing fluid. Each container 70 has a heater 74 for maintaining the desired temperature of the respective fluids for post processing. A waste tank 72 is also provided to collect the support material as it is removed from the article 48 during post processing. Valve 76 directs the fluid in the container 44 to the appropriate containers 70 or waste tank 72 during post processing. Valve 78 controls whether fluid being delivered into the chamber 44 will pass through spigot 80 or through spray nozzles 82. Valve 88 determines which fluid medium will be delivered to the chamber, and a filter 84 and pump 86 complete the system for delivering the fluids to and from the chamber 44 during post processing.

To use the apparatus 50, an operator places an article 48 into the rotatable basket 46 and secures it to the basket. The air heater 58 is then activated to raise the temperature in the chamber so as to provide the initial bulk melt of the support material 54. The support material melts and flows to the bottom of the chamber 44. Valve 76 is turned so that the support material flows into waste tank 72. After the initial bulk melt, the article is allowed to cool below the freezing point of the phase change support material to cause interstitial separation of the residual support material. This is accomplished by inactivating the heating element of the air heater 58. Valves 76, 88, and 78 are then adjusted to allow a heat transferring fluid medium in one of the two containers 70 to be pumped into the chamber 44. Pump 86 is operated so that the article is submerged in the fluid medium within the chamber. The chamber heater 64 is operated to maintain the temperature of the fluid medium at the appropriate level while the agitation device is activated 66 to assist in removing the residual support material from the article. If needed, the basket can also be rotated to assist in removing support material.

After an appropriate period of time, the fluid medium is drained back into its original container 70. Valve 82 is then adjusted and the pump 86 activated to jet the fluid medium through spray nozzles 82 to drive any residual support material in the chamber down and into container 70. Valves 76, 88, and 78 are then adjusted and pump 86 activated to spray a rinsing fluid medium that is held in the other container 70 into the chamber 44. The rinsing fluid medium re-circulates back to the other container 70 as it is sprayed. After rinsing, the air heater 58 is activated to dry the article, which is then ready to be removed from the basket in the apparatus along with the platform 56 by the operator.

Some maintenance of the apparatus is necessary as the apparatus 50 is used to post process various articles. From time to time the operator shall need to dispose or recycle the support material that has accumulated in the waste container 72. Additionally, residual support material in the fluid medium container 70 shall need to be removed from time to time. By allowing the temperature in the container 70 to fall below the freezing point of the support material, the support material will solidify and can be readily skimmed off the top surface of the fluid medium.

What has been described are preferred embodiments in which modifications and changes may be made without departing from the spirit and scope of the accompanying claims.

What is claimed is:

1. A method of post processing an article formed by solid freeform fabrication to remove a support structure, the article comprising a three-dimensional object and the support structure, the three-dimensional object and the support structure comprising at least one phase change component, the method comprising the steps of:
    (a) providing a temperature controllable environment for the article;
    (b) placing the article in the temperature controllable environment at a temperature that causes the support structure to transition to a flowable state;
    (c) removing substantially all of the support structure in the flowable state from the article;
    (d) changing the temperature of the controllable environment to a temperature just above the freezing point of the phase change component;
    (e) holding the temperature of the controllable environment just above the freezing point of the phase change component until the temperature of all the regions of the three-dimensional object substantially equalize; and
    (f) lowering the temperature of the three-dimensional object below the freezing point of the phase change component.

2. The method of claim 1 wherein the step of removing substantially all of the support structure is accomplished by holding the temperature of the temperature controllable environment above the melting point of the phase change component until substantially all of the support structure transitions to a flowable state and is removed from the three-dimensional object.

3. The method of claim 2 further comprising the step of, after substantially all of the support structure is removed, lowering the temperature of the temperature controllable environment below the freezing point of the phase change component so that the remaining support structure in contact with the three-dimensional object transitions to a non-flowable state.

4. The method of claim 1 further comprising the step of;
    providing at least one heat transferring fluid medium in the temperature controllable environment.

5. The method of claim 4 wherein the fluid medium is selected from the group consisting of an aqueous solution, an oil-based solution, and an oil-based fluid.

6. The method of claim 4 wherein the phase change component is soluble in the fluid medium.

7. The method of claim 4 wherein the phase change component is immiscible in the fluid medium.

8. The method of claim 4 wherein the fluid medium is an aqueous solution including a surfactant establishing an emulsion with the phase change component in the flowable state.

9. The method of claim 4 further comprising the step of:
    providing agitation to the three-dimensional object via the fluid medium.

10. The method of claim 9 wherein the agitation is provided by ultrasonic stimulation.

11. The method of claim 4 wherein the heat transferring fluid medium used in step (c) is air.

12. The method of claim 6 wherein the heat transferring fluid medium used in steps (d), (e), and (f) is selected from the group consisting of an aqueous solution, an oil-based solution, and an oil-based fluid.

13. The method of claim 1 wherein the step of changing the temperature of the temperature controllable environment to just above the freezing point of the phase change component is a temperature of between about 60° C. to about 65° C.

14. The method of claim 1 wherein the step of holding the temperature of the controllable environment just above the freezing point is accomplished for a time period of at least about 20 minutes.

15. The method of claim 1 wherein the phase change component is a wax material having a freezing point of between about 33° C. to about 60° C. and a melting point of between about 45° C. to about 65° C.

16. A method of post processing an article formed by solid freeform fabrication to remove a support structure, the article comprising a three-dimensional object and the support structure, the three-dimensional object and the support structure comprising at least one phase change component, the method comprising the following steps:

(a) providing a temperature controllable environment for the article;

(b) placing the article in the temperature controllable environment at a temperature that causes the support structure to transition to a flowable state;

(c) removing substantially all of the support structure in the flowable state from the article;

(d) submersing the article in a fluid medium in the temperature controllable environment at a temperature above the melting point of the phase change component, the phase change component being at least partially soluble in the fluid medium; and (e) lowering the temperature of the three-dimensional object in the fluid medium below the freezing point of the phase change component.

17. The method of claim 16 wherein the article is submersed in the fluid medium prior to removing substantially all of the support structure in the flowable state from the article.

18. The method of claim 16 wherein the step of removing substantially all of the support structure is accomplished by holding the temperature of the controllable environment above the melting point of the phase change component until substantially all of the support structure transitions to a flowable state and is removed from the three-dimensional object.

19. The method of claim 18 further comprising the step of, after substantially all of the support structure is removed, lowering the temperature of the temperature controllable environment below the freezing point of the phase change component so that the remaining support structure in contact with the three-dimensional object transitions to a non-flowable state.

20. The method of claim 16 further comprising the step of providing agitation to the three-dimensional object via the fluid medium.

21. The method of claim 20 wherein the agitation is provided by ultrasonic stimulation.

22. The method of claim 16 wherein the fluid medium is selected from the group consisting of an oil-based solution or an oil-based fluid.

23. The method of claim 16 wherein the fluid medium comprises fatty acid esters.

24. The method of claim 23 wherein the fatty acid esters are derived from organic oils selected from the group consisting of linseed oil, soybean oil, castor oil, sunflower seed oil, tall oil, tung oil, and combinations thereof.

25. The method of claim 16 wherein air is used as a heat transferring medium in step (c).

26. The method of claim 16 wherein the temperature of the temperature controllable environment in step (c) is a temperature greater than about 60° C.

27. The method of claim 16 further comprising the steps of:

removing the fluid medium from the temperature controllable environment;

rinsing the three-dimensional object in an aqueous solution to remove any residual fluid medium the three-dimensional object; and drying the article.

28. The method of claim 1 wherein the phase change component is a wax material having a freezing point of between about 46° C. to about 50° C. and a melting point of between about 52° C. to about 58° C.

* * * * *